(12) United States Patent
  Doran

(10) Patent No.: US 9,809,090 B1
(45) Date of Patent: Nov. 7, 2017

(54) SILICONE COATING SUITED FOR AUTOMOTIVE WINDSHIELDS AND PROCESS FOR PREPARATION

(71) Applicant: Raymond T Doran, Lindenhurst, NY (US)

(72) Inventor: Raymond T Doran, Lindenhurst, NY (US)

( * ) Notice: Subject to any disclaimer, the term of this patent is extended or adjusted under 35 U.S.C. 154(b) by 194 days.

(21) Appl. No.: 14/268,123

(22) Filed: May 2, 2014

(51) Int. Cl.
  *B60J 1/00* (2006.01)
  *B05D 5/00* (2006.01)
  *C03C 17/30* (2006.01)

(52) U.S. Cl.
  CPC ............... *B60J 1/002* (2013.01); *B05D 5/00* (2013.01); *C03C 17/30* (2013.01)

(58) Field of Classification Search
  CPC .................................................. C03C 17/30
  See application file for complete search history.

(56) References Cited

U.S. PATENT DOCUMENTS

| 3,244,541 A | * | 4/1966 | Fain | ........................ C03C 17/30 106/13 |
| 3,579,540 A | * | 5/1971 | Ohlhausen | .............. C03C 17/30 106/18.12 |
| 5,759,618 A | * | 6/1998 | Taylor | ................. C03C 23/0075 427/140 |

* cited by examiner

*Primary Examiner* — Alex A Rolland
(74) *Attorney, Agent, or Firm* — Richard B. Klar, Esq.; Law Office of Richard B Klar

(57) ABSTRACT

A silicone coating is provided for glass and other surfaces with improved glass clarity and maintenance requirements. In addition a process for preparing a silicone film with improved glass clarity and maintenance requirements. Further a method is provided for adhering an improved silicone coating to a glass (or other) surface. Also a silicone coating is provided for granite, cement, and lexan/plastic.

4 Claims, 1 Drawing Sheet

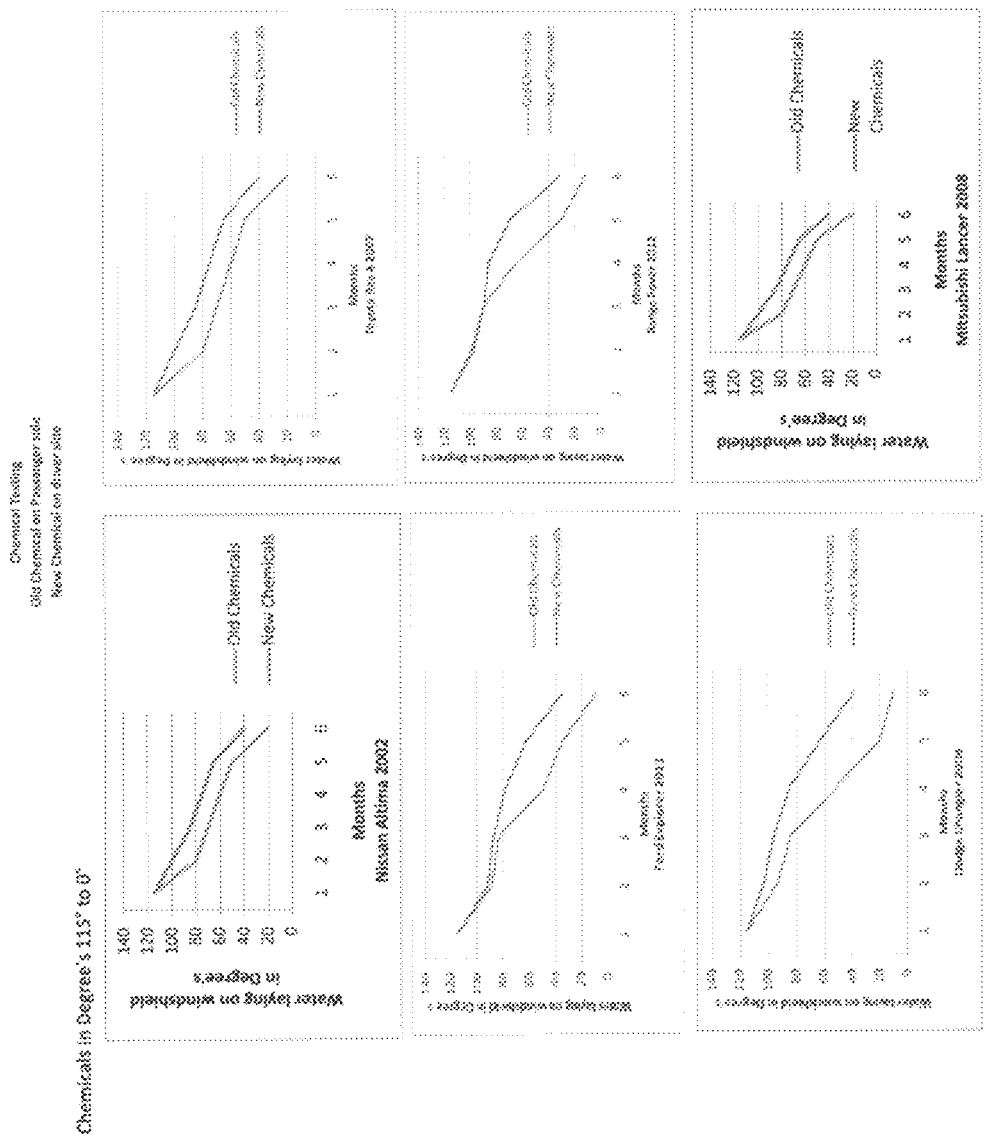

SILICONE COATING SUITED FOR AUTOMOTIVE WINDSHIELDS AND PROCESS FOR PREPARATION

BACKGROUND

1. Field

This invention relates to a silicone film for coating glass and other surfaces, and process for its preparation. In particular the present invention relates to an improved silicone coating and method for the same that provides for better and more effective protection of glass surfaces including improved coated glass clarity, enhanced hydrophobic properties and reduced maintenance requirements. such as but not limited to automotive vehicle windshields.

2. The Related Prior Art

Glass products are often coated with silicone films to provide them with a cleanable, water repellant surface. Silicones are polymers that include silicon, C, H, O and other elements $(R_2SO_2)n$. Silicone films are attached to surfaces by chemical bonding. The instant invention improves the strength of the chemical bonding of the silicone to the surface it is applied to over prior coatings. Various methods exist for creating silicone coatings, notably that indicated in U.S. Pat. No. 6,245,387 to Hayden (hereinafter the Hayden patent), and commercially known as the Diamond Fusion process; and applicant's old chemical process, whose film provides the commercially known compound. However, the Hayden patent process provides a coating that requires a watered surface for application, while the instant invention may be applied to dry surfaces. While applicant's old chemical process does permit dry application, the present invention provides a coating with surprisingly improved coated glass clarity, enhanced hydrophobic properties and reduced maintenance requirements. This product may be used on automobile windshields, but also on a wide range of products.

SUMMARY

The present invention provides a silicone coating for glass and other surfaces with improved glass clarity and maintenance requirements and a process for preparing the same. It provides a method for adhering an improved silicone coating to a glass (or other) surface and for a silicone coating for granite, cement, and lexan/plastic.

Further objects and advantages of this invention will be apparent from the following detailed description and examples of a presently preferred embodiment.

BRIEF DESCRIPTION OF THE DRAWING

FIG. 1 illustrates in detail the improved maintenance ability of the invention over a prior art coating

DETAILED DESCRIPTION OF THE PREFERRED EMBODIMENT(S)

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Referring to FIG. 1, FIG. 1 demonstrates that the prior art compound commercially called "the Crystal Fusion Process" and listed here as "old chemical" has a decreased ability to "bead" up on the windshield at various temperatures over time as versus the "new chemical" of the invention. The prior art compound is adhered on the passenger side of 6 different makes of automobile (Nissan Altima 2002, Ford Explorer 2011, Dodge Charger 2008, Toyota Rav 4 2007, Range Rober 2013 and Mitsubishi Lancer 2008), while the coating of the invention ("new chemical" is adhered to the driver side of the very same vehicle. The consequent "beading up" on each side is tested over the course of 6 months at various temperatures, and the coating of the invention is shown to maintain its beading up ability for a longer period of time than the prior art compounds. This demonstrates its ability to remain on the windshield for a longer period of time decreasing maintenance and resultant costs.

In order to provide the instant silicone coating, dimethyldiethoxysilane (commercial known as GP-49 tm) is reacted with an acid, preferably sulfuric acid, and the silicon oxygen bonds are cleaved providing a step one chemical. The resulting step one chemicals are further reacted with an alcohol, preferably isopropanol in highly specific ratios providing a step 2 chemical. Step 1 and 2 chemicals are mixed together to provide chemical A. The Step 2 chemical has a further small amount of acid added to it, providing a chemical B. Finally, chemicals A and B are mixed together, providing the silicone coating of the invention. The highly specific ratios of the invention are demonstrated in the below example I. In the instant invention GP-49TM is 60% of the composition, the alcohol (preferably isopropanol) is 40% and the acid (preferably sulfuric acid) is. 040%.

Hydrophobic coatings have been shown to improve the visibility of the glass product. The instant invention improves the glass clarity beyond the prior art coatings. Significantly, driver reaction time is enhanced by the improved visibility. Improved visibility is also superior due to the enhanced maintenance function of the invention, as dirt, moisture and insects cling to the surface less than prior art products. The enhanced maintenance ability of the instant invention is demonstrated in FIG. 1.

Example 1

Process for Preparing Silicone Coating:

1. Take 2, 1 gallon empty Amber jugs and fill them up with dimethyldiethoxysilane (GP-49 tm) and add a half of an ounce of acid—let sit for 48 hours.
2. Then take 2 empty one gallon Amber jugs and put 118 oz of Isopropanol alcohol in each one and then remove 10 oz of step 1 (dimethyldiethoxysilane and acid) and add it to the 118 oz isopropanol alcohol giving you 128 oz (1 gallon) and let sit for 48 hours. This provides Step 1 chemical take 70.5 oz of Step 1 chemical (dimethyldiethoxysilane and acid) and pour into an empty 1 gallon Amber jug.
3. Then take 57.5 oz of step 2 (Isopropanol w/dimethyldiethoxysilane/acid) and pour it into the jug with the 70.5 oz and let sit for 48 hours. That will make a finished 1 gallon chemical A.
4. Take the 1 gallon of step 2 chemical (Isopropanol with the GP-49/acid) and add 1 Tsp. of Acid and let sit for 48 hours. And that will make a finished 1 gallon chemical B.
5. The steps above will make a finished 1 gallon of step A and 1 gallon of step B.

This provides 55 one gallon jugs of each chemical and both are poured into a 55 gallon drum for commercial use.

Example II

Processing for Applying a Chemical Coating to a Glass Surface

Clean the glass surface before application, preferably with alcohol, rinse with water, and then dry. Apply Chemical A to the surface with a wipette. Let dry, and apply chemical B, also with a wipette to the glass surface. Let dry. The resulting coating will have the improved maintenance properties demonstrated in FIG. 1.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for applying a chemical coating to a glass surface, the steps consisting of:
   cleaning a glass surface before application;
   rinsing said glass surface, and then drying;
   applying chemical A to the surface wherein said chemical A is formed by
   reacting dimethyldiethoxysilane with 0.040% acid for 48 hours, providing a step 1 chemical;
   reacting 118 ounces of alcohol with 10 ounces of step 1 chemical providing a step 2 chemical and letting it sit for 48 hours; and reacting 70.5 ounces of step 1 chemical with 57.5 ounces of step 2 chemical for 48 hours, thereby providing said chemical A;
   drying said application of chemical A on said surface and applying chemical B to said glass surface wherein said chemical B is formed by reacting the step 2 chemical with 1 teaspoon of acid for 48 hours, thereby providing said chemical B; and
   drying said application said chemical B to said surface.

2. The method according to claim 1 wherein said chemical A is applied to said surface with a wipette.

3. The method according to claim 1 wherein said Chemical B is applied to said surface with a wipette.

4. The method according to claim 1 wherein said glass surface is cleaned with alcohol and rinsing said glass surface with water.

* * * * *